United States Patent [19]

Yoshida

[11] 4,368,635
[45] Jan. 18, 1983

[54] KNOCKING DETECTOR

[75] Inventor: Kenichi Yoshida, Yokosuka, Japan

[73] Assignee: Nissan Motor Company, Limited, Yokohama, Japan

[21] Appl. No.: 212,319

[22] Filed: Dec. 2, 1980

[30] Foreign Application Priority Data

Dec. 4, 1979 [JP] Japan .................................. 54-156994

[51] Int. Cl.³ ............................................ G01L 23/22
[52] U.S. Cl. ....................................................... 73/35
[58] Field of Search ..................... 73/35; 123/425, 435

[56] References Cited

U.S. PATENT DOCUMENTS

| 4,002,155 | 1/1977 | Harned et al. ...................... 123/425 |
| 4,111,035 | 9/1978 | West et al. ............................... 73/35 |
| 4,153,020 | 5/1979 | King et al. ........................... 73/35 X |
| 4,279,143 | 7/1981 | Guipaud .................................. 73/35 |

FOREIGN PATENT DOCUMENTS 2513056 2/1975 Fed. Rep. of Germany .
2917412 11/1979 Fed. Rep. of Germany .

Primary Examiner—James J. Gill
Attorney, Agent, or Firm—Schwartz, Jeffery, Schwaab, Mack, Blumenthal & Koch

[57] ABSTRACT

A knocking detector senses engine vibration and produces an electrical signal corresponding to such vibration. This signal is then rectified and smoothed to produce a background noise signal. When the magnitude of the background noise level signal is greater than a reference value, the amplitude of the rectified signal is limited so that the background noise level signal has a substantially constant level. This limited background noise level signal is then compared with the initial signal from the sensor, and if the initial signal from the sensor is greater in magnitude than the background noise signal, the engine is considered to be in knocking condition.

5 Claims, 5 Drawing Figures

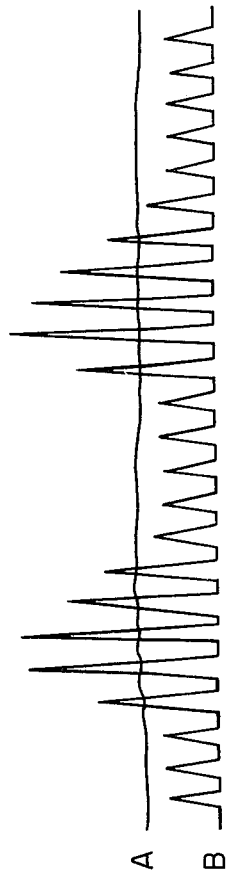
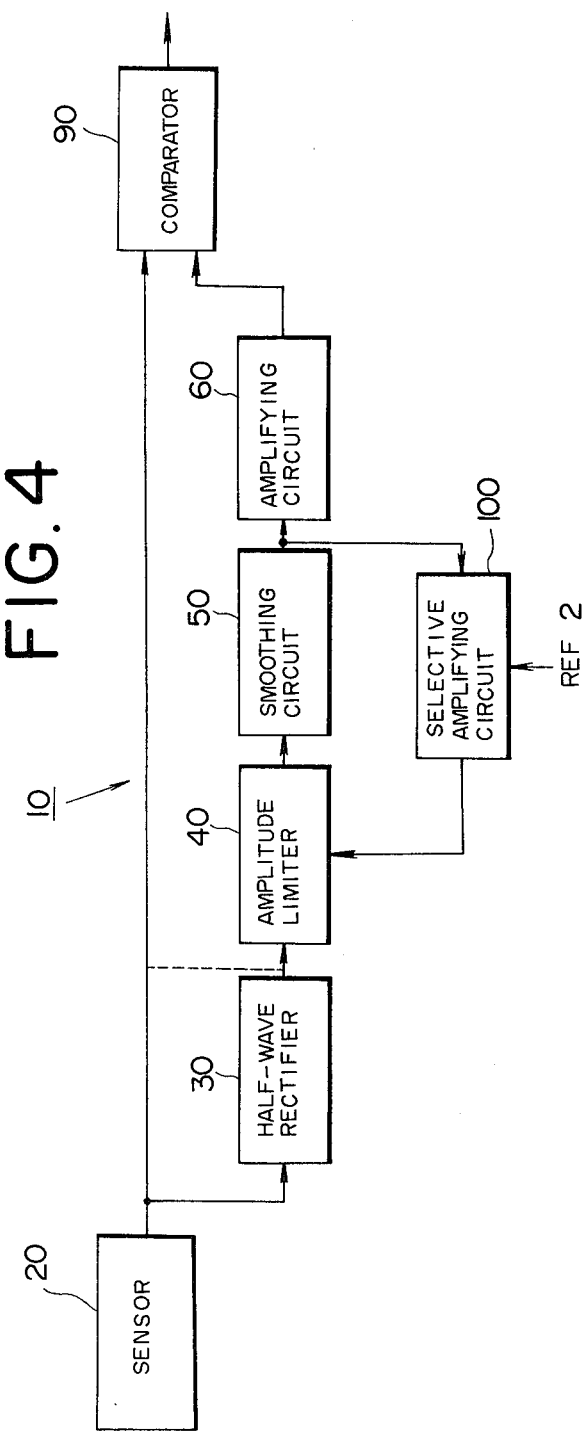

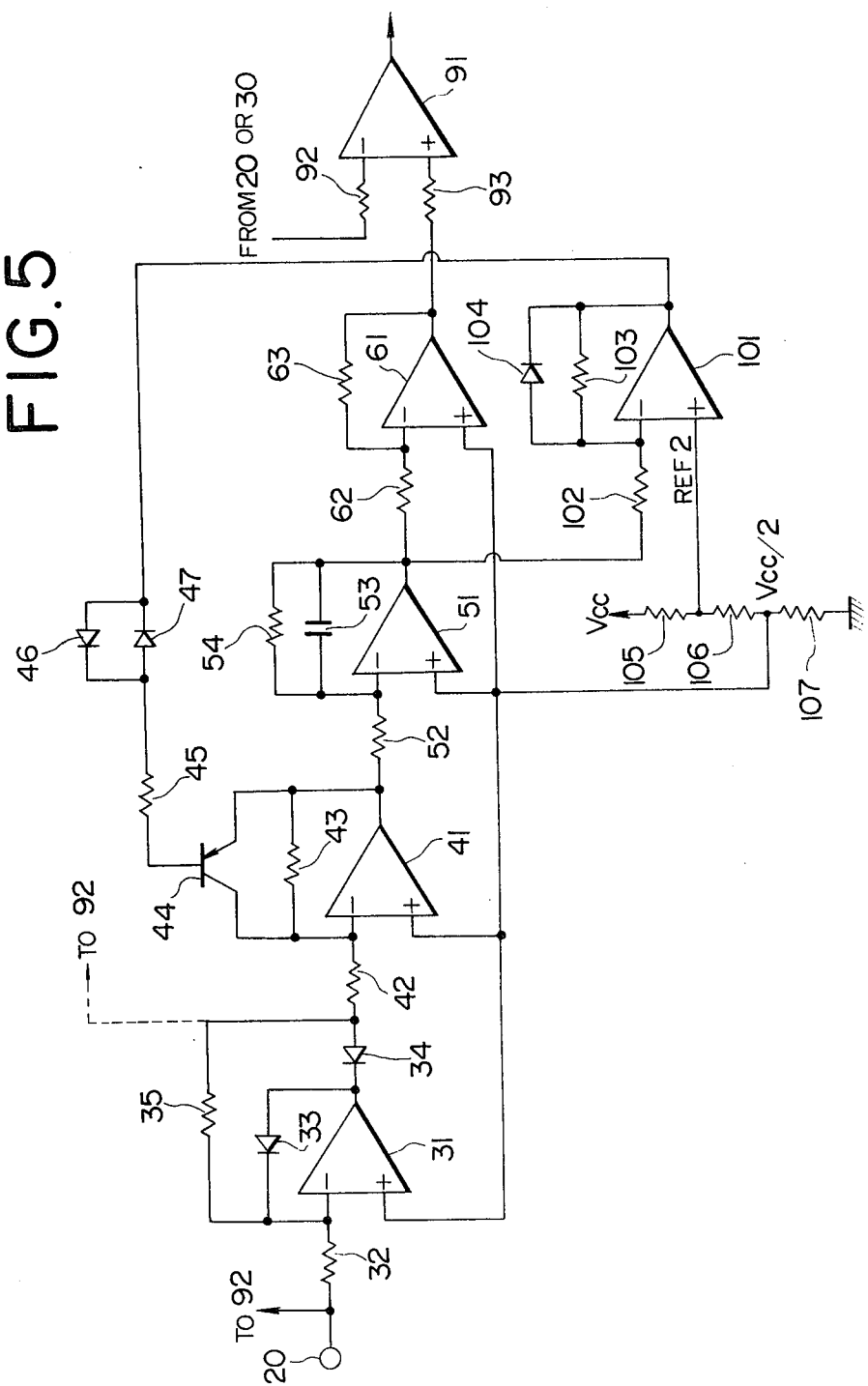

KNOCKING DETECTOR

BACKGROUND OF THE INVENTION

1. Field of the Invention

The present invention relates to a knocking detector for an internal combustion engine.

2. Description of the Prior Art

When strong knocking continues in an internal combustion engine, the engines durability is adversely affected. It is known, however, that slight knocking at relatively low engine speeds brings about best engine output and fuel economy. There is a close relationship between the occurrence of knocking and the ignition timing; the further the ignition timing is advanced, the more knocking occurs.

Conventionally, a system has been proposed wherein the knocking state of the engine is sensed to adjust the ignition timing to maintain a slight knocking state, thereby improving fuel economy and engine output.

It is known that when knocking occurs, the engine vibrates, thereby resulting in an increase of the amplitude of the vibration component with a particular frequency. The above conventional system utilizes this fact; it includes a sensor which senses the vibration of the engine body, selects a band of particular frequency vibration components, removes a component corresponding to the background noise level to determine the knocking intensity from the remaining portion, and retards the spark timing when knocking stronger than a predetermined level occurs to limit the knocking to an appropriate magnitude.

Actually, it is very difficult to determine the level of the background noise. For example, where the output signal of a vibration sensor is rectified and thus smoothed to obtain a signal corresponding to the background noise level, this signal contains knocking components and so does not reflect exactly the background noise level. Thus, when knocking occurs, the knocking strength is likely to appear to be lower than its actual value.

It is an object of the present invention to provide a knocking detector which determines the knocking strength with high accuracy.

SUMMARY OF THE INVENTION

A knocking detector according to the present invention senses engine vibration and produces a first input signal corresponding to such vibration. This signal is then rectified to produce a second rectified input signal. This second signal is smoothed to produce a background noise level signal. Means is provided, which responds to the background noise level signal for limiting the amplitude of the second rectified input signal when the amplitude of the background noise level signal is greater than a predetermined reference value. Knocking indication signal generating means is provided, which responds to the input signal and to the background noise level signal to generate a knocking indication signal when the input signal is greater in magnitude than the background noise level signal.

BRIEF DESCRIPTION OF THE DRAWINGS

These and other objects, features and advantages of the present invention will be more clearly appreciated from the following description taken in conjunction with the accompanying drawings in which like reference numerals designate corresponding elements, and in which:

FIG. 3 is an illustration showing the rectified signal and the background noise level signal;

FIG. 4 is a diagram, similar to FIG. 1, of a second embodiment of the knocking detector; and FIG. 5 is a diagram, similar to FIG. 2, of the second embodiment.

DETAILED DESCRIPTION OF THE PREFERRED AND ALTERNATIVE EMBODIMENTS

Figure 1:
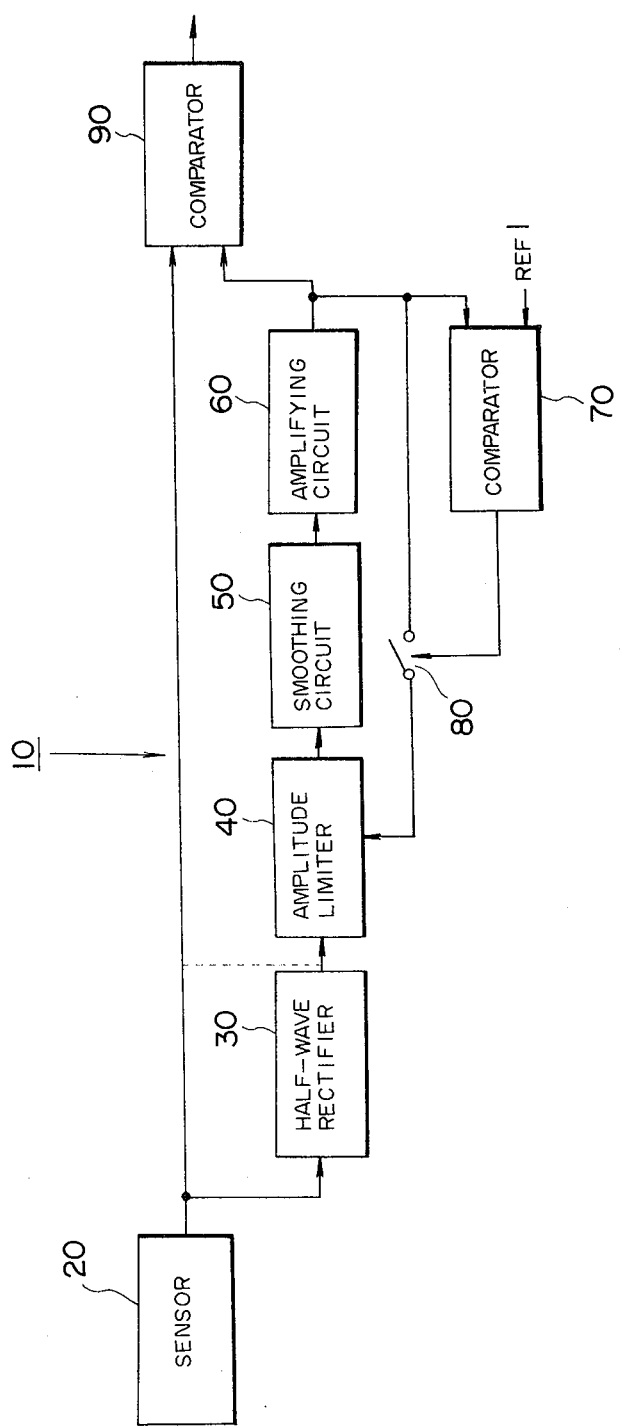
FIG. 1 is a block diagram of a preferred embodiment of a knocking detector according to the present invention.
Figure 2:
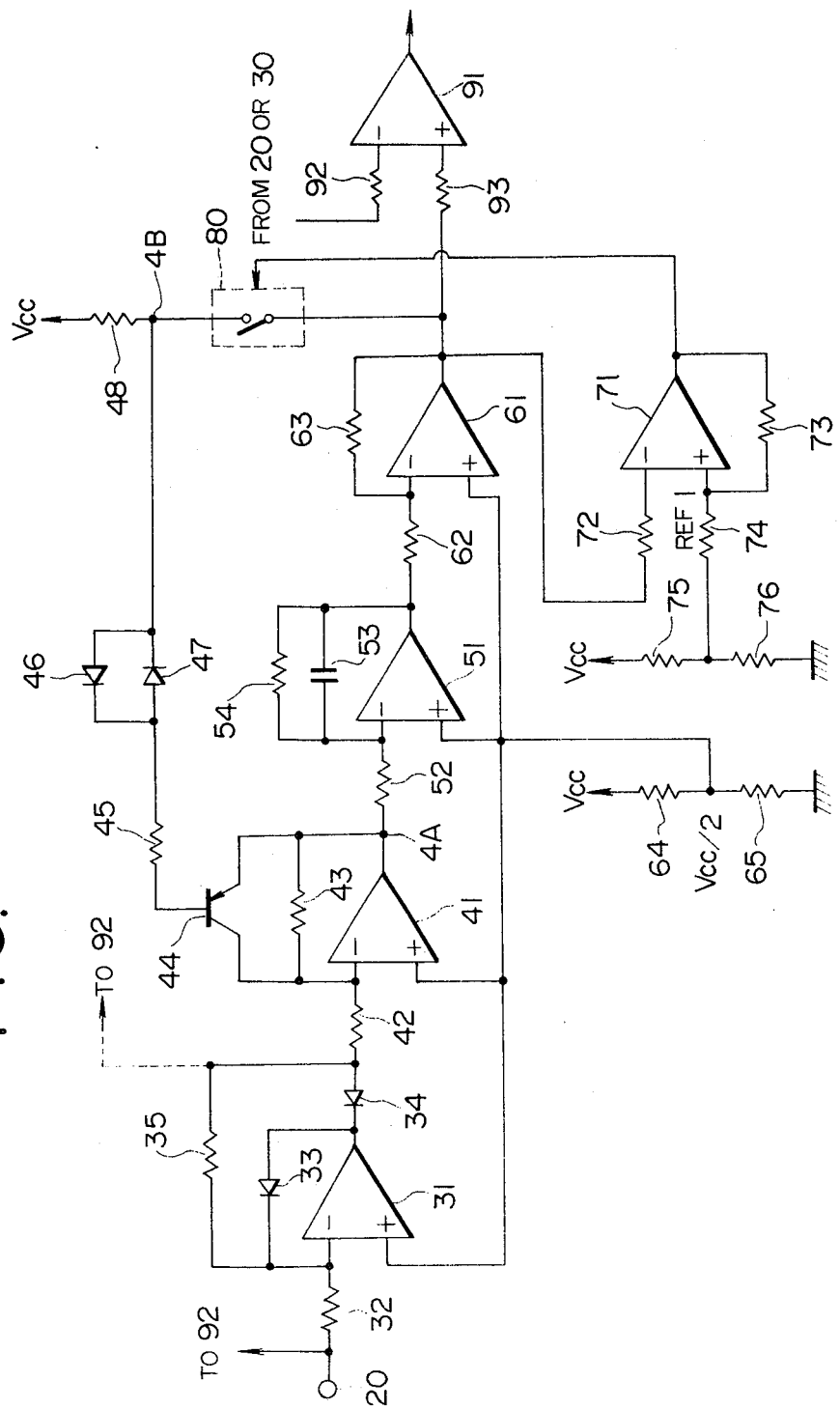
FIG. 2 is a schematic diagram of the knocking detector shown in FIG. 1.

Referring to FIGS. 1 and 2, there is shown a preferred embodiment of a knocking detector according to the present invention, designated generally by 10. The detector includes a sensor 20 which senses a vibration occurring in the internal combustion engine. A half-wave rectifier 30 is provided which comprises an operational amplifier 31, an input resistor 32 connecting the output of the sensor and the inverting input of the amplifier 31, a diode 33 whose cathode is connected to the inverting input of the amplifier and whose anode is connected to the output of the amplifier, a second diode 34 whose cathode is connected to the output of the amplifier and whose anode is connected through a feedback resistor 35 to the inverting input of the amplifier.

An amplitude limiter 40 is provided which includes an operational amplifier 41, an input resistor 42 connecting the anode of the diode 34 and the inverting input of the amplifier 41, a feedback resistor 43 connecting the inverting input and the output of the amplifier 41, and a transistor 44 whose collector is connected to the inverting input of the amplifier 41 and whose emitter is connected to the output of the amplifier 41, and whose base is connected to a power supply Vcc through a resistor 45, a pair of anti-parallel connected diodes 46 and 47 to adjust the operative level of the transistor, and a resistor 48.

A smoothing circuit 50 is provided which includes an operational amplifier 51, an input resistor 52 connecting the output of the amplifier 41 and the inverting input of the amplifier 51, a feedback circuit of parallel connected capacitor 53 and resistor 54 connecting the inverting input and the output of the amplifier 51.

An amplifying circuit 60 is provided which includes an operational amplifier 61, an input resistor 62 connecting the output of the amplifier 51 and the inverting input of the amplifier 61, and a feedback resistor 63 connecting the inverting input and the output of the amplifier 61.

A reference voltage Vcc/2, obtained from the junction of a pair of equal resistors 64 and 65 connected in series across a power supply Vcc, is applied to the respective noninverting inputs of the amplifiers 31, 41, 51 and 61.

A comparator 70 is provided which includes an operational amplifier 71, an input resistor 72 connecting the output of the amplifier 61 and the inverting input of the amplifier 71, a feedback resistor 73 connecting the noninverting input and the output of the amplifier 71, a second input resistor 74 connecting the noninverting input of the amplifier 71 and the junction of a pair of resistors 75 and 76 connected in series across a power supply Vcc.

An analog switch 80 is provided which connects the output of the amplifier 61 and the resistor 48 and is adapted to be operated by the output of the amplifier 71.

A comparator 90 is provided which includes an operational amplifier 91, an input resistor 92 connecting the output of the sensor and the inverting input of the amplifier 91, and a second input resistor 93 connecting the output of the amplifier 61 and the noninverting input of the amplifier 91.

In operation, the output of the sensor is rectified by the half-wave rectifier 30, as shown by B in FIG. 3, whose output is supplied to the limiter 40. When the analog switch 80 is open, the base voltage level of the transistor 44 is pulled up, and as a result the transistor 44 is turned off. Thus the limiter 40 serves only as an amplifier without limiting the amplitude of the signal passing therethrough. On the other hand, when the analog switch is closed, the transistor 44 is turned on, provided that the output 4A of the amplifier 41 is higher than the voltage level at a point 4B which is the junction of the resistor 48 and the analog switch 80. Thus the amplitude of the signal passing through the amplifier 41 undergoes a limiting process. When the analog switch 80 is closed and the output voltage level 4A is lower than the voltage level 4B, the amplitude of the signal passing through the limiter 40 undergoes no limitation.

The output from the limiter 40 is smoothed by the smoothing circuit 50 whose output is, in turn, amplified by the amplifying circuit 60 to an appropriate degree, thereby resulting in a background noise level signal, shown by A in FIG. 3, which is compared with a reference voltage level REF 1 in the comparator 70. When the noise level signal is higher than the reference level, the output of comparator 70 closes the analog switch 80, whereas when the noise level signal is lower than the reference level REF 1, the comparator 70 opens the analog switch 80.

Thus the relatively large amplitude portions of the rectified signal due to knocking are prevented from being supplied to the smoothing circuit 50. As a result, the background noise level signal affected not so much by the knocking is supplied to the comparator 90 and there compared with the output of the sensor to produce a pulse signal corresponding to the knocking.

Referring to FIGS. 4 and 5, there is shown a second embodiment of the knocking detector. This embodiment is of the same structure except that in place of the analog switch 80, the resistor 48 and the comparator 70, a selective amplifying circuit 100 is provided which includes an operational amplifier 101, an input resistor 102 connecting the output of the smoothing circuit 50 and the inverting input of the amplifier 101, a feedback resistor 103 connecting the inverting input and the output of the amplifier 101, and a diode 104 whose anode is connected to the inverting input of the amplifier 101 and whose cathode is connected to the output of the amplifier. The output of the amplifier is connected through the pair of anti-parallel diodes 46 and 47 to the transistor 44. The noninverting input of the amplifier 101 is supplied with a reference voltage level REF 2 obtained from the junction of two resistors 105 and 106. These two resistors and a third resistor 107 are connected in series across a power supply Vcc. When the output of the amplifier 51 is lower than the reference voltage level REF 2, the selective amplifying circuit 100 operates as an amplifier so that the transistor 44 does not operate. On the other hand, when the output of the amplifier 51 is higher than the reference voltage level REF 2, the transistor 44 is turned on thereby limiting the amplitude of the signal passing through the limiter.

The output of the comparator 90 in FIGS. 1 and 4 may be integrated with respect to time to determine the knocking strength. When the knocking is relatively strong, the output level of the sensor is high so that the number and duration of pulses from the comparator 90 are relatively large.

In the above embodiments, the rectifier 30 is shown as being a half-wave rectifier, but it may equally be a full-wave rectifier. Further, one input to the comparator 90 is shown as being obtained from the sensor 20, but it may be obtained from the rectifier 30, as shown by a broken line in each of FIGS. 1, 2, 4 and 5.

It will be understood by those skilled in the art that the foregoing description is made in terms of preferred and alternative embodiments of the present invention wherein various changes and modifications may be made without departing from the spirit and scope of the invention, which is to be defined by the appended claims.

What is claimed is:

1. A knocking detector for use with an internal combustion engine, comprising:
   (a) means for sensing engine vibration and producing a first input signal indicative thereof;
   (b) means for rectifying the first input signal and producing a second rectified input signal;
   (c) means for smoothing the second rectified input signal to produce a background noise level signal;
   (d) first comparing means for comparing the magnitude of the background noise level signal to a predetermined reference value;
   (e) means responsive to the first comparing means for limiting the amplitude of the second rectified input signal when the amplitude of the background noise level signal is greater than said predetermined reference value; and
   (f) second comparing means for comparing said first input signal to the background noise level signal and generating a knocking indication signal when said first input signal is greater in magnitude than the background noise level signal.

2. The knocking detector according to claim 1, wherein said limiting means includes first amplifying means disposed between said rectifying means and said smoothing means, said amplifying means including a first operational amplifier, a feedback circuit comprising a resistor connecting the input and output of said amplifier, and means for controlling the resistance of said feedback circuit responsive to the output of said first comparing means.

3. The knocking detector according to claim 2, wherein said controlling means includes a transistor connecting the output and input of said amplifier, an analog switch for supplying therethrough said second rectified input signal to said transistor to render the same conductive or non-conductive, and wherein said analog switch is connected to the output of said first comparing means whereby said first comparing means is operative to close or open said analog switch.

4. The knocking detector according to claim 2, wherein said controlling means includes a transistor connecting the output and input of said amplifier, and wherein said first comparing means comprises a second operational amplifier for receiving the output of said smoothing means, a feedback circuit comprising a resistor and a diode connected in parallel and connecting the input and output of said second amplifier for outputting an output to turn on said transistor when the input to said second amplifying means is higher than a predetermined reference level to render said transistor conductive.

5. The knocking detector according to any of claims 1 to 4, further including third amplifying means disposed between said smoothing means and said second comparing means.

* * * * *